United States Patent [19]

Lew

[11] Patent Number: 5,054,318
[45] Date of Patent: Oct. 8, 1991

[54] RESONANCE FREQUENCY LIQUID LEVEL SENSOR

[76] Inventor: Hyok S. Lew, 7890 Oak St., Arvada, Colo. 80005

[21] Appl. No.: 477,489

[22] Filed: Feb. 9, 1990

[51] Int. Cl.$^5$ ............................................. G01F 23/00
[52] U.S. Cl. ........................................................ 73/290
[58] Field of Search .................. 73/290 V, 319, 579, 73/DIG. 1

[56] References Cited

U.S. PATENT DOCUMENTS

| | | | |
|---|---|---|---|
| 1,257,693 | 2/1918 | Furman | 73/321 |
| 3,372,592 | 3/1968 | Gravert | 73/290 V |
| 3,555,905 | 1/1971 | George | 73/321 |
| 3,874,236 | 4/1975 | Reck | 73/290 V |
| 4,213,337 | 7/1980 | Langdon | 73/290 V |

FOREIGN PATENT DOCUMENTS

| | | | |
|---|---|---|---|
| 1042251 | 10/1958 | Fed. Rep. of Germany | 73/290 V |
| 1205305 | 11/1965 | Fed. Rep. of Germany | 73/290 V |
| 1419950 | 10/1965 | France | 73/320 |
| 202311 | 10/1985 | Japan | 73/290 V |
| 620828 | 8/1978 | U.S.S.R. | 73/290 V |

OTHER PUBLICATIONS

R. M. Langdon, "Vibratory Process Control Transducers", *Electronic Engineering* vol. 53, No. 659 Nov. 1981, pp. 159-162.

Primary Examiner—William A. Cuchlinski, Jr.
Assistant Examiner—W. Morris Worth

[57] ABSTRACT

A liquid level sensor comprises an elongated member with at least one fixed extremity under flexural vibration extending across free surface of a liquid and a slide member attached to the elongated member in a sliding relationship following the length thereof, wherein the slide member floats at the free surface of liquid by buoyancy force thereof or is attracted to a float with a magnet; whereby the liquid level is determined from a natural frequency of the flexural vibration of the elongated member, that varies as a function of the liquid level.

11 Claims, 1 Drawing Sheet

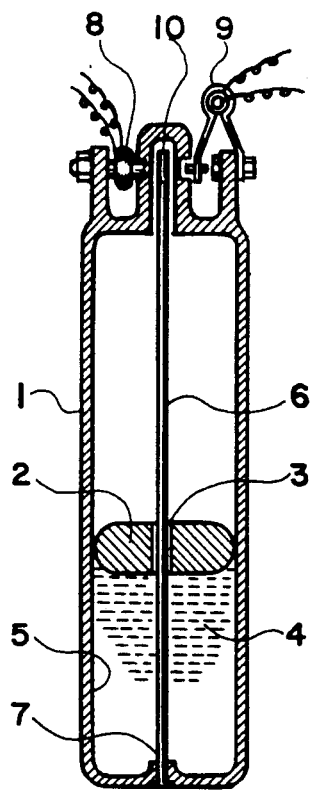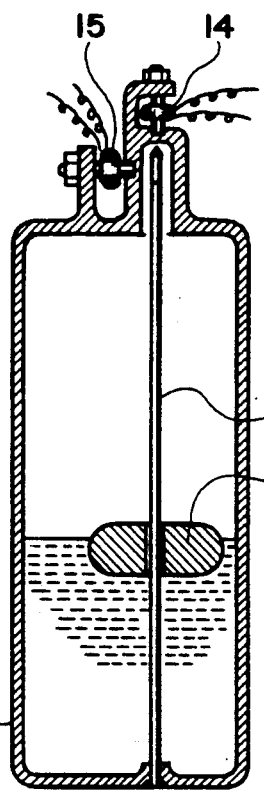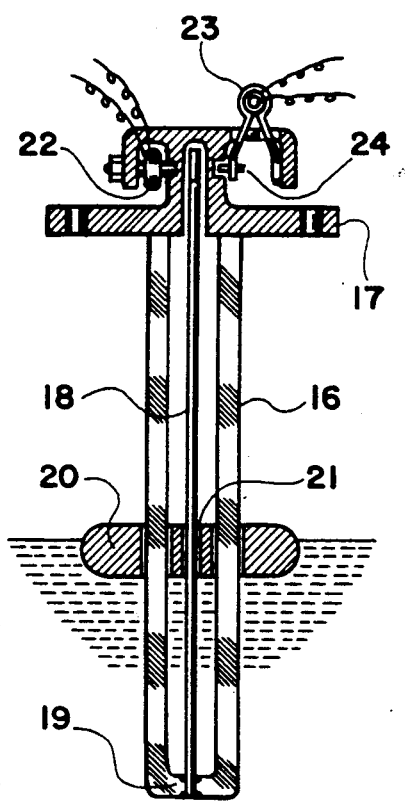
Fig. 1　　　　Fig. 2　　　　Fig. 3
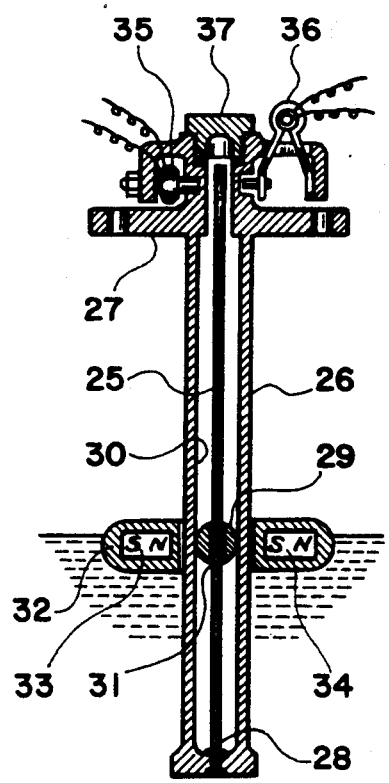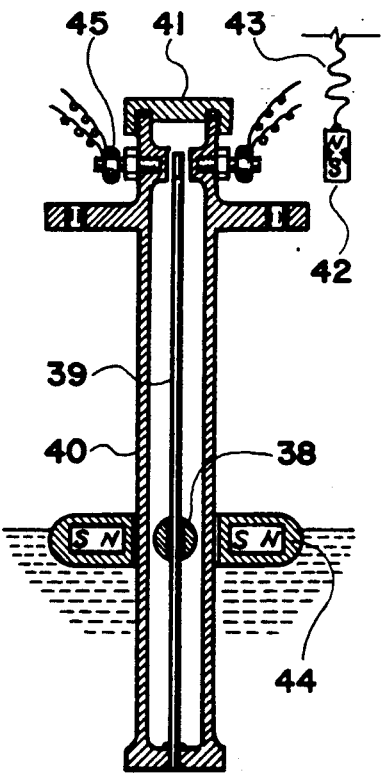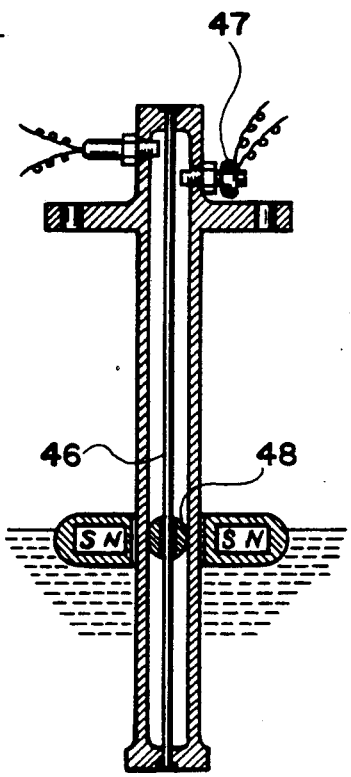
Fig. 4　　　　Fig. 5　　　　Fig. 6

RESONANCE FREQUENCY LIQUID LEVEL SENSOR

BACKGROUND OF THE INVENTION

There is a imperative necessity of and strong demand for a liquid level sensor, that continuously measures the level of a liquid contained in a tank or reservoir in an accurate and reliable manner, whereby it provides a means for inventorying the liquid medium stored in the tank or reservoir in collaboration with flowmeters measuring in and out flows of the liquid medium therein. For example, an accurate and reliable liquid level sensor can be used as a leak detector for the underground gasoline or diesel fuel tanks, as the discrepancy between the flow data deducted from the liquid level sensor and the flow data provided by the custody transfer flowmeters provides an indication whether the gasoline or diesel fuel is being lost by a leak or evaporation.

BRIEF SUMMARY OF THE INVENTION

The primary object of the present invention is to provide a liquid level sensor comprising an elongated member under a flexural vibration, that extends across the free surface of the liquid meeium, wherein the natural frequency of the flexural vibration varies as a function of the liquid level, whereby the liquid level is determined from the natural frequency of the flexural vibration.

Another object is to provide a liquid level sensor comprising an elongated member under a flexural vibration, that is partially submerged in the liquid medium and protrudes out of the liquid medium, wherein a float floating at the free surface of a liquid medium and sliding on the elongated member with little lateral relative movement therebetween acts like a moving support for the elongated member, that varies the length of section of the elongated member under flexural vibration and, consequently, varies the natural frequency of the flexural vibration as a function of the liquid level; whereby the liquid level is determined from the natural frequency of the flexural vibration.

A further object is to provide a liquid level sensor comprising an elongated member disposed within an elongated hollow cylindrical container and anchored to one extremity thereof, which combination extends across the free surface of a liquid medium, wherein a ferromagnetic member disposed within the hollow cylindrical container is mounted on the elongated member in a sliding relationship with little lateral tolerance therebetween and a float with a permanent magnet is slidably mounted on the hollow cylindrical container; whereby the natural frequency of the flexural vibration of the elongated member varies as a function of the liquid level, as the ferromagnetic member following the movement of the float changes the lengthwise distribution of mass under flexural vibration when there is clearance between the ferromagnetic member and the wall of the elongated hollow cylindrical container or as the ferromagnetic member following the movement of the float and acting as a moving support for the elongated member changes the length of section of the elongated member under flexural vibration when there is little clearance between the ferromagnetic member and the wall of the elongated hollow cylindrical container.

These and other objects of the present invention will become clear as the description thereof progresses.

BRIEF DESCRIPTION OF THE FIGURES

The present invention may be described with a greater clarity and specificity by referring to the following figures:

FIG. 1 illustrates a cross section of an embodiment of the resonance frequency liquid level sensor comprising an elongated member under flexural vibration, that is supported by a float mounted thereon in a sliding relationship with little lateral tolerance therebetween.

FIG. 2 illustrates a cross section of another embodiment of the resonance frequency liquid/level sensor including an elongated member under flexural vibration and a float mounted thereon in a sliding arrangement.

FIG. 3 illustrates cross section of a further embodiment of the resonance frequency liquid level sensor including an elongated member under flexural vibration and a float mounted thereon in a slidable arrangement.

FIG. 4 illustrates a cross section of an embodiment of the resonance frequency liquid level sensor comprising an elongated member under flexural vibration disposed within an elongated hollow cylindrical container extending across the free surface of a liquid medium, wherein a ferromagnetic member following the magnetized float acts as a moving support for the elongated member:

FIG. 5 illustrates a cross section of an embodiment of the resonance frequency liquid level sensor comprising an elongated member under flexural vibration disposed within an elongated hollow cylindrical container extending across the free surface of a liquid medium, wherein a ferromagnetic member following the magnetized float varies lengthwise distribution of mass under flwxural vibration.

FIG. 6 illustrates a cross section of a further embodiment of the resonance frequency liquid level sensor comprising an elongated member with two fixed extremities under flexural vibration and a ferromagnetic member following the magnetized float, that acts as a moving support or as a moving vibrating mass, which changes the natural frequency of the flexural vibration.

DESCRIPTION OF THE ILLUSTRATED EMBODIMENTS

In FIG. 1 there is illustrated a cross section of an embodiment of the resonance frequency liquid level sensor of the present invention comprising an elongated member under flexural vibration and a float providing a moving support for the elongated member. A tank or reservoir 1 with a constant cross section has a float 2 with a centrally located hole 3, wherein the float moving up and down following the level of the liquid 4 is guided by the cylindrical wall 5 of the tank 1 in a manner similar to a piston engaging a cylinder in a nearly free-sliding relationship. An elongated member 6 such as a rod with a sizable stiffness is disposed within the tank 1 parallel to the central axis of the tank 1, which elongated member 6 engages the hole 3 included in the float 2 in a sliding relationship with little relative lateral movement therebetween, wherein at least one extremity of the elongated member 6, e.g., preferably the bottom extremity 7, is anchored to wall of the tank 1. An electromagnetic vibrator 8 induces a flexural vibration of the elongated member at a natural frequency thereof, while a motion sensor 9 such as a Piezo electric type with a magnetic motion pick-up or induction coil with a magnetic core detects the flexural vibration, from which the natural frequency of the flexural vibration is determined. The float 2 acts like a moving support for the elongated member 6 and, consequently, the length of section of the elongated member 6 under flexural vibration varies as a function of the liquid level, which variation changes the natural frequency of the flexural vibration. It is well known fact that the natural frequency of flexural vibration of an elongated member is inversely proportional to the length of the section of the elongated member under the flexural vibration. The length of the section of the elongated member 6 under flexural vibration decreases with rising liquid level and increases with receding liquid level. Therefore, the natural frequency increases with rising liquid level and decreases with receding liquid level.

It is also well known fact that the natural frequency of an elongated member with a sliding mass increases inversely proportional to the distance between the anchoring point and sliding mass mounted on the elongated member. Therefore, the natural frequency of the elongated member employed in FIG. 5 decreases with rising liquid level and increases with receding liquid level. The liquid level is determined from the natural frequency of the flexural vibration of the elongated member 6 by using a theoretically or empirically established mathematical relationship. It is preferred that the elongated member 6 is made of a non-magnetic material such as the stainless steel, that is tipped with a ferromagnetic material or a permanent magnet 10. It should be understood that the elongated member 6 can be secured to the tank 1 at both extremities thereof, wherein the electromagnetic vibrator 8 is now located at a position away from the anchored upper end of the elongated member 6. It is readily realized that the elongated member 6 with both ends anchored can be a wire under tension in place of a stiff rod.

In FIG. 2 there is illustrated a cross section of another embodiment of the resonance frequency liquid level sensor having essentially the same construction and operating principles as that shown and described in conjunction with FIG. 1 with one exception being that the float 11 providing a moving support for the elongated member 12 under flexural vibration is no longer guided by the wall of the tank 13. The inertia of the float 11 and the friction between the float 11 and the liquid in the tank 13 is usually sufficient to prevent the float 11 from vibrating with the elongated member 12 and, consquently, the former effectively acts as a moving support for the latter. In this particular embodiment, a motion sensor employing a magnetic pick-up coil 14 is employed in place of a Piezo electric type. It should be mentioned again that the elongated member 12 may be anchored to the tank 13 at both extremities thereof and the electromagnetic vibrator 15 may be disposed at a location separated from the anchored upper end of the elongated member 12 by a small distance, wherein the elongated member 12 can be a rod or wire under tension.

In FIG. 3 there is illustrated an embodiment of the resonance frequency liquid level sensor, that extends from a flange to be affixed to a structure disposed above the liquid. A rigid elongated support 16 anchored to a flange 17 extends from the face of the flange 17. The elongated member 18 under flexural vibration is disposed parallel to the elongated support 16, wherein at least one extremity of the elongated member 18 is secured to the over-hanging extremity 19 of the elongated support 16. A float 20 slidably guided by the elongated support 16, that has a centrally located hole 21 engaged by the elongated member 18 in a close tolerance relationship, acts as a moving support for the elongated member 18. The electromagnetic vibrator 22 anchored to a structure tied to the flange 17 induces a flexural vibration of the elongated member 18, while the motion sensor 23 detects the flexural vibration. The liquid level is determined from a natural frequency of the flexural vibration of the elongated member. It should be mentioned that the elongated member 18 may be anchored at both extremities and the electromagnetic vibrator 22 may be relocated to a position some distance away from the anchored upper end of the elongated member, wherein the motion sensing leg 24 of the Piezo electric type motion sensor 23 can be under a physical contact with the upper extremity of the elongated member 18. It should be also mentioned that the float 20 may not be guided by the elongated support 16 as suggested by the embodiment shown in FIG. 2.

In FIG. 4 there is illustrated a cross section of an embodiment of the resonance frequency liquid level sensor employing a float including a magnet. The elongated member 25 under flexural vibration is disposed within a sealed elongated cylindrical container 26 extending from a mounting flange 27 in a coaxial arrangement, wherein at least one extremity e.g., preferqbly the bottom extremity 28, of the elongated member is secured to the cylindrical container 26. The moving support 29 with cross section closely matched to the cross section of the cylindrical cavity 30 included in the elongated cylindrical container 26 has a centrally located hole 31 that is engaged by the elongated member 25 in a close tolerance. A float 32 including one or more magnet 33 and 34 is mounted on the elongated cylindrical container 26 in a slidable arrangement. The electromagnetic vibrator 35 induces a flexural vibration of the elongated member 25 at a natural frequency thereof, while the motion sensor 36 detecting the flexural vibration provides information on the natural frequency of the flexural vibration. The liquid level is determined from the natural frequency of the flexural vibration of the elongated member 25. The upper end of the elongated cylindrical container 26 includes a removable cap 37, that is for providing an access to the interior of the elongated cylindrical container 26 in case of the accidental fall of the moving support 29 to the bottom of the elongated cylindrical container 26 and away from the magnetized float 32, whereby the moving support 29 can be fished by a magnet 42 tied to a string 43 shown in FIG. 5 and brought back to a section where the magnetized float 32 is located. It should be understood that the elongated member 25 may be affixed at both extremities thereof and the electromagnetic vibrator 37 may be relocated to a position separated from the anchored upper end of the elongated member 25 by a small distance as shown by embodiment illustrated in FIG. 6, wherein the elongated member 25 can be a rod or wire under tension.

In FIG. 5 there is illustrated a cross section of another embodiment of the resonance frequency liquid level sensor, that has essentially the same construction as that of the embodiment shown in FIG. 4 with one exception, which exception is the moving mass 38 sliding on the elongated member 39 with little lateral relative movement therebetween, which moving mass 39 now replaces the sliding support 29 shown in FIG. 4. The moving mass 39 is isolated from the wall of the elongated cylindrical container 40 and, consequently, is allowed to vibrate with the elongated member 39 without being interfered by the wall of the elongated cylindrical container 40. The upper end of the elongated cylindrical container 40 has a removable cap 41, that is for lowering the fishing magnet 42 secured to a string 43 into the interior of the elongated cylindrical container to retrieve the moving mass 38 accidentally dropped to the bottom of the elongated cylindrical container 40 and bring it back to a section where the magnetized float 44 is located. The moving mass 38 following the magnetized float 44 changes the resonance frequency of the flexural vibration of the elongated member. "It is well known fact that the natural frequency of the elongated member 39 decreases with increasing distance from the secured lower end of the elongated member 39 to the mass 38 and vice versa. Therefore, the resonance frequency of the elongated member 39 decrease with rising liquid level and increases with receding liquid level.". The liquid level is determined from the resonance frequency by using a theoretically or empirically established mathematical relationship. The elongated member 39 may be secured at both extremities and the electromagnetic vibrator 45 may be relocated to a position some distance away from the anchored upper end of the elongated member 39 as shown by the embodiment illustrated in FIG. 6, wherein the elongated member can be a rod or wire under tension.

In FIG. 6 there is illustrated a cross section of a further embodiment of the resonance frequency liquid level sensor, that is a modification of the embodiment shown in FIGS. 4 or 5. The elongated member 46 under flexural vibration is now affixed at both extremities thereof and the electromagnetic vibrator 47 is located at a section some distance away from the fixed upper end of the elongated member 46, whereby the flexural vibration of the elongated member 46 is more readily induced thereby. Since both extremities of the elongated member 46 are now anchored, a rod or wire under tension can be employed as the elongated member 46. The particular illustrated embodiment employs a moving support 48 sliding on the elongated member 46, which can be readily converted to a moving mass 38 shown in FIG. 5 by simply reducing the external dimension thereof.

While the principles of the present inventions have now been made clear by the illustrative embodiments, there will be many modifications of structures, arrangements, proportions, elements and materials immediately obvious to those skilled in the art, which are particularly adapated to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property of priviledge is claimed, are defined as follows:

1. An apparatus for measuring liquid level comprising in combination:
    a) an elongated member extending across free surface of a liquid with one extremity disposed on one side of the free surface above the liquid and the other extremity disposed on the other side of the free surface submerged in the liquid, wherein at least one of the two extremities of the elongated member is secured to a supporting structure;
    b) a movable support mounted on the elongated member and moving along the length of the elongated member in a sliding relationship following the free surface of the liquid, wherein said movable support prevents flexural vibration of the elongated member and creates a nodal section in the flexural vibration of the elongated member at section where the movable support is located;
    c) means for inducing a flexural vibration of a section of the elongated member intermediate said one extremity of the elongated member and said movable support; and
    d) means for detecting a natural frequency of the flexural vibration of said section of the elongated member as a measure of liquid level determined from a functional relationship wherein said natural frequency increases with rising liquid level and decreases with receding liquid level.

2. A combination as set forth in claim 1 wherein said movable support comprises a float floating at the free surface of liquid, wherein the elongated member extends through a hole included in the float in a close tolerance relationship.

3. A combination as set forth in claim 2 wherein sliding movement of said float along the length of the elongated member is guided by a vertical wall of a vessel containing the liquid.

4. A combination as set forth in claim 2 wherein sliding movement of said float along the length of the elongated member is guided by at least one rigid elongated guide disposed parallel to the elongated member.

5. A combination as set forth in claim 1 wherein the elongated member is disposed coaxially within an elongated cylindrical container extending across the free surface of the liquid and sealed off from the liquid; and said movable support comprises a plug disposed within the elongated cylindrical container in a sliding relationship with a close tolerance wherein the elongated member extends through a hole included in said plug in a close tolerance relationship, and a float floating at the free surface of the liquid and mounted on the elongated cylindrical container in a sliding relationship, wherein at least one of the plug and the float includes a magnet attracting the plug and the float to one another, whereby the plug follows the float following the free surface of the liquid.

6. An apparatus for measuring liquid level comprising in combination:
    a) an elongated member extending across free surface of a liquid with one extremity disposed on one side of the free surface above the liquid in an arrangement free of any constraint preventing flexural movement thereof and the other extremity disposed on the other side of the free surface submerged in the liquid and secured to a supporting structure;
    b) a moveable support mounted on the elongated member and moving along the length of the elongated member in a sliding relationship following the free surface of the liquid, wherein said movable support prevents flexural vibration of the elongated member and creates a nodal section in the flexural vibration of the elongated member at section where the movable support is located;
    c) means for inducing a flexural vibration of a section of the elongated member intermediate said one extremity of the elongated member and said movable support; and d) means for detecting a natural frequency of the flexural vibration of said section of the elongated member as a measure of liquid level determined from a functional relationship wherein said natural frequency increases with rising liquid level and decreases with receding liquid level.

7. A combination as set forth in claim 6 wherein said movable support comprises a float floating at the free surface of liquid, wherein the elongated member extends through a hole included in the float in a close tolerance relationship.

8. A combination as set forth in claim 7 wherein sliding movement of said float along the length of the elongated member is guided by a vertical wall of a vessel containing the liquid.

9. A combination as set forth in claim 7 wherein sliding movement of said float along the length of the elongated member is guided by at least one rigid elongated guide disposed parallel to the elongated member.

10. A combination as set forth in claim 6 wherein the elongated member is disposed coaxially within an elongated cylindrical container extending across the free surface of the liquid and sealed off from the liquid; and said movable support comprises a plug disposed within the elongated cylindrical container in a sliding relationship with a close tolerance wherein the elongated member extends through a hole included in said plug in a close tolerance relationship, and a float floating at the free surface of the liquid and mounted on the elongated cylindrical container in a sliding relationship, wherein at least one of the plug and the float includes a magnet attracting the plug and the float to one another, whereby the plug follows the float following the free surface of the liquid.

11. An apparatus for measuring liquid level comprising in combination:
a) an elongated cylindrical container extending across free surface of a liquid and sealed off from the liquid;
b) an elongated member disposed across the free surface of liquid within said elongated cylindrical container, wherein only one of the two extremities of the elongated member located on the submerged side from the free surface is secured to a support structure;
c) a mass member disposed within said elongated cylindrical container with a spacing therebetween, said mass member including a hole engaged by the elongated member in a sliding relationship with close tolerance;
d) means for inducing a flexural vibration of the elongated member; and
e) means for detecting natural frequency of the flexural vibration of the elongated member as a measure of liquid level determined from a functional relationship wherein said natural frequency decreases with rising liquid level and increases with receding liquid level.

* * * * *